(12) United States Patent
Sawada

(10) Patent No.: US 10,291,803 B2
(45) Date of Patent: May 14, 2019

(54) IMAGE FORMING APPARATUS

(71) Applicant: CANON KABUSHIKI KAISHA, Tokyo (JP)

(72) Inventor: Hirohisa Sawada, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/692,713

(22) Filed: Aug. 31, 2017

(65) Prior Publication Data

US 2018/0077307 A1    Mar. 15, 2018

(30) Foreign Application Priority Data

Sep. 9, 2016 (JP) ................................. 2016-176558

(51) Int. Cl.
*G03G 15/00* (2006.01)
*H04N 1/00* (2006.01)
*G03G 21/16* (2006.01)

(52) U.S. Cl.
CPC ..... *H04N 1/00564* (2013.01); *G03G 21/1604* (2013.01); *H04N 1/00384* (2013.01); *H04N 1/00493* (2013.01); *H04N 2201/0094* (2013.01)

(58) Field of Classification Search
CPC ................................................ G03G 15/5016
See application file for complete search history.

(56) References Cited

U.S. PATENT DOCUMENTS

| 2008/0175640 A1* | 7/2008 | Akiyama | G03G 15/6552 399/405 |
| 2014/0169823 A1 | 6/2014 | Ishida | |
| 2017/0026530 A1 | 1/2017 | Sawada | |
| 2018/0041649 A1* | 2/2018 | Koyanagi | H04N 1/00496 |

FOREIGN PATENT DOCUMENTS

| CN | 101085575 | 12/2007 |
| CN | 104391436 | 3/2015 |
| CN | 107436544 | 12/2017 |
| JP | 2013-70279 A | 4/2013 |

OTHER PUBLICATIONS

Chinese Office Action dated Mar. 4, 2019 during prosecution of related Chinese application No. 201710812178.X (with English translation).

* cited by examiner

*Primary Examiner* — Clayton E. LaBalle
*Assistant Examiner* — Jas Sanghera
(74) *Attorney, Agent, or Firm* — Venable LLP

(57) ABSTRACT

An image forming apparatus includes a main assembly; an operating portion mounted in a front surface side of the main assembly so as to be slidable in a widthwise direction of the main assembly and configured to be capable of inputting a signal to the main assembly, wherein the operating portion includes a first connector and a second connector; a first cable configured to electrically connect the main assembly and the first connector of the operating portion in a state in which a first loop is formed; and a second cable having a cable diameter smaller than a cable diameter of the first cable and configured to electrically connect the main assembly and the second connector of the operating portion in a state in which a second loop is formed inside the first cable.

11 Claims, 8 Drawing Sheets

IMAGE FORMING APPARATUS

FIELD OF THE INVENTION AND RELATED ART

The present invention relates to an image forming apparatus of an electrophotographic type, an electrostatic recording type or the like, and particularly relates to an image forming apparatus including a large-sized operating panel, such as an operating panel.

A conventional image forming apparatus of the electrophotographic type has been widely used as a copying machine, a printer, a plotter, a facsimile machine, a multifunction machine having a plurality of functions of these machines, and the like. The image forming apparatus includes an operating panel for receiving an instruction from a user and for notifying the user of various pieces of information. In recent years, in consideration of usability of the image forming apparatus, the operating panel is constituted so as to be movable relative to an image forming apparatus main assembly. For example, Japanese Laid-Open Patent Application (JP-A) 2013-70279 discloses an image forming apparatus in which an operating panel is slidable (movable) relative to a main assembly of the image forming apparatus.

However, in the image forming apparatus disclosed in JP-A 2013-70279, when a constitution in which the image forming apparatus main assembly and the operating panel are electrically connected with each other using a plurality of cables different in diameter is employed, the following problem generates. As the cables for connecting the operating panel and the image forming apparatus main assembly, a cable, such as a signal cable capable of high-speed transmission, having a relatively large bending rigidity (flexural rigidity) and a cable having a diameter narrower than a diameter of the former cable and having a bending rigidity smaller than the bending rigidity of the former cable are used. These (plurality of) cables are provided with excessive lengths, so that even when the operating panel is in any position within a movable range thereof, the cables are connected with the operating panel in a looped state so as not to be disconnected from the operating panel. In such a constitution, when the cable narrower in diameter is disposed outside the cable broader in diameter, an installation space of the plurality of cables in the operating panel increases.

SUMMARY OF THE INVENTION

A principal object of the present invention is to provide an image forming apparatus capable of improving operativity of moving a (movable) operating panel and capable of reducing an installation space of a plurality of cables in the operating panel while using the cables including the cable having a large bending rigidity.

According to an aspect of the present invention, there is provided an image forming apparatus comprising: a main assembly; an operating portion mounted in a front surface side of the main assembly so as to be slidable in a widthwise direction of the main assembly and configured to be capable of inputting a signal to the main assembly, wherein the operating portion includes a first connector and a second connector; a first cable configured to electrically connect the main assembly and the first connector of the operating portion in a state in which a first loop is formed; and a second cable having a cable diameter smaller than a cable diameter of the first cable and configured to electrically connect the main assembly and the second connector of the operating portion in a state in which a second loop is formed inside the first cable.

According to another aspect of the present invention, there is provided an image forming apparatus comprising: a main assembly; an operating portion movably mounted to the main assembly and configured to be capable of inputting a signal to the main assembly; a holding portion fixed to the main assembly and configured to movably hold the operating portion; a first cable configured to electrically connect the main assembly and the operating portion; a second cable configured to electrically connect the main assembly and the operating portion and having a cable diameter smaller than a cable diameter of the first cable; a first connector provided in the operating portion and configured to be connected with the first cable; a second connector provided in the operating portion and configured to be connected with the second cable; and a retaining portion provided in the holding portion and configured to retain the first and second cables at the holding portion, wherein the first cable is disposed between the operating portion and the holding portion so that the first cable forms a first loop from the retaining portion until the first cable is connected with the first connector, wherein the second cable is disposed between the operating portion and the holding portion so that the second cable forms a second loop from the retaining portion until the second cable is connected with the second connector, and wherein the first and second connectors are disposed so that a radium of curvature of the first loop is larger than a radium of curvature of the second loop.

Further features of the present invention will become apparent from the following description of exemplary embodiments with reference to the attached drawings.

DESCRIPTION OF EMBODIMENTS

In the following, an embodiment of the present invention will be specifically described with reference to FIGS. 1 to 8.

In this embodiment, as an example of an image forming apparatus, a full-color printer of a tandem type is described. However, the image forming apparatus in the present invention is not limited to the full-color printer of the tandem type but may also be an image forming apparatus of another type. Further, the image forming apparatus is not limited to the full-color image forming apparatus, but may also be an image forming apparatus for forming a monochromatic image or a mono-color image.

Figure 1:
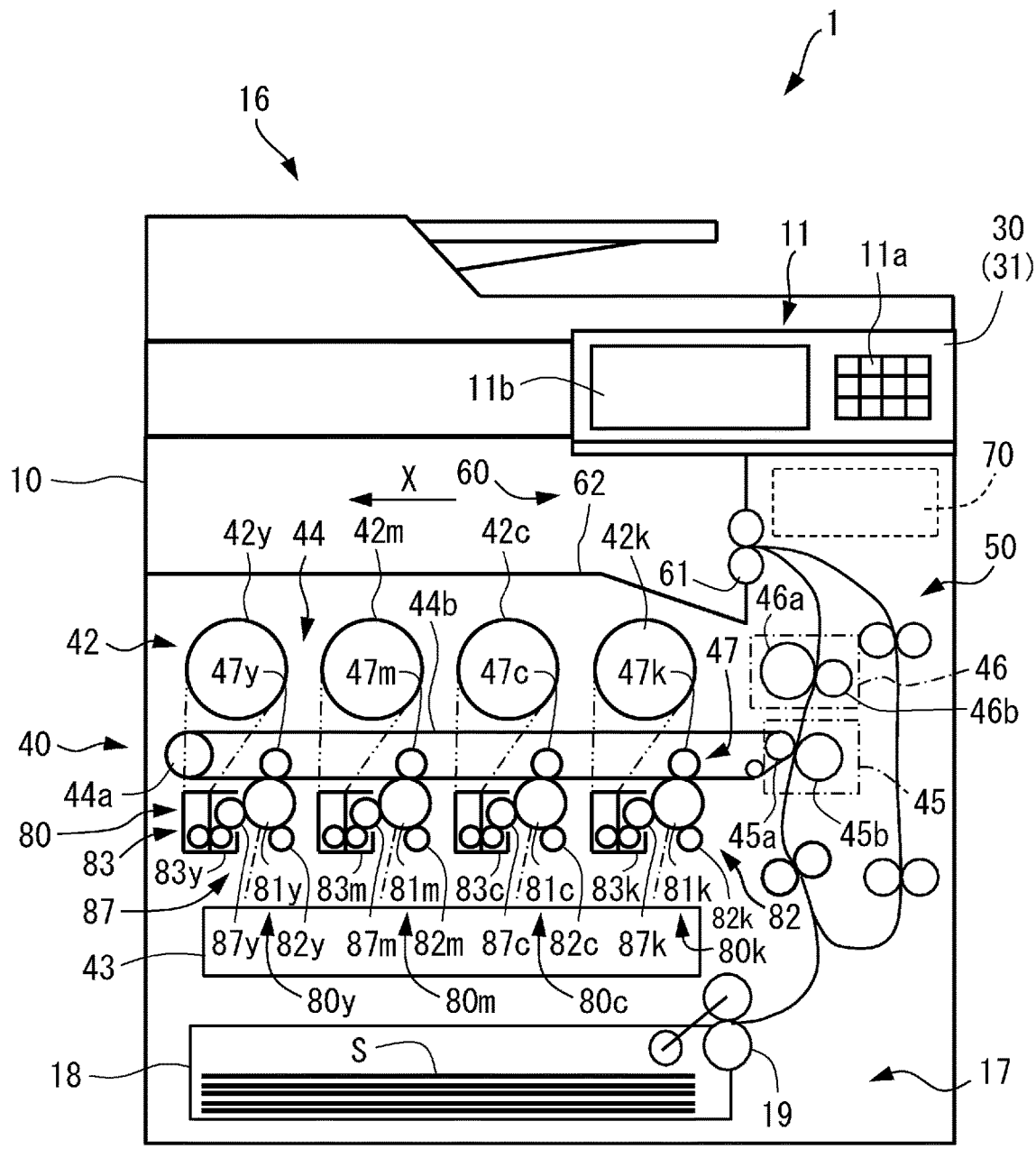
FIG. 1 is a sectional view showing a schematic structure of an image forming apparatus according to an embodiment of the present invention.

As shown in FIG. 1, an image forming apparatus 1 includes an image forming apparatus main assembly 10 as a casing. At an upper font portion of the apparatus main assembly 10, an operating unit 11 is mounted. The operating unit 11 is provided with operating buttons 11a and a display portion 11b capable of displaying a state of the image forming apparatus 1, and a signal is capable of being inputted to the apparatus main assembly 10 through the operating unit 11. Details of the operating unit 11 will be described later. Further, at a front portion of the apparatus main assembly 10, an unshown human sensor capable of detecting standing of an operator in the neighborhood of the front surface of the apparatus main assembly 10 is provided.

The apparatus main assembly 10 includes an image reading portion 16, a sheet feeding portion 17, an image forming portion 40, a sheet conveying portion 50, a sheet discharging portion 60, and a controller 70. On a sheet S as a recording material, a toner image is to be formed, and specific examples of the sheet S may include plain paper, a synthetic resin material sheet as a substitute for the plain paper, thick paper, a sheet for an overhead projector, and the like.

The image reading portion 16 is provided at an upper portion of the apparatus main assembly 10. The image reading portion 20 converts reflected light of an original, placed on a platen glass, to a digital signal, and seconds the digital signal to the controller 70.

The sheet feeding portion 17 is disposed at a lower portion of the apparatus main assembly 10, and includes a sheet cassette 18 for stacking and accommodating the sheet S such as recording paper and includes a feeding roller 19. The sheet feeding portion 17 feeds the accommodated sheet S to the image forming portion 40.

The image forming portion 40 includes an image forming unit 80, a toner container 42, a laser scanner 43, an intermediary transfer unit 44, a secondary transfer portion 45 and a fixing device 46. The image forming portion 40 is capable of forming an image on the sheet S on the basis of image information. The image forming apparatus 1 in this embodiment is adapted to full-color image formation, and image forming units 80y, 80m, 80c and 80k for four colors of yellow (y), magenta (m), cyan (c) and black (k), respectively, have the same constitution and are separately provided. Also toner containers 42y, 42m, 42c and 42k for the four colors, and primary transfer rollers 47y, 47m, 47c and 47k for the four colors have the same constitution and are separately provided. In FIG. 1, respective constituent elements for the four colors are represented by adding color identifiers to reference numerals or symbols thereof, but in the specification, will be described using only the reference numerals or symbols without adding the color identifiers in some cases.

The image forming unit 80 includes a photosensitive drum 81y, 81m, 81c or 81k for forming a toner images, charging rollers 82y, 82m, 82c and 82k, and a developing devices 83y, 83m, 83c and 83k.

Each of the photosensitive drums 81 is rotated by an unshown drum motor and is circulated and moved while carrying an electrostatic latent image formed on the basis of image information during image formation. The charging roller 82 contacts a surface of the photosensitive drum 1 and electrically charges the photosensitive drum surface. A developing sleeve 87 of the developing device 83 magnetically holds a developer in a developing container by a magnet fixedly provided inside the developing sleeve 87 and feeds the developer to a gap between itself and the photosensitive drum 81, and thus executes a developing process. The laser scanner 43 exposes the surface of the photosensitive drum 81, charged by the charging roller 82, to light and forms the electrostatic latent image on the surfaces of the photosensitive drum 81.

The intermediary transfer unit 44 includes a driving roller 44a, an unshown follower roller, a plurality of primary transfer rollers 47y, 47m, 47c and 47k, and the intermediary transfer belt 44b wound around these rollers. The primary transfer rollers 47y, 47m, 47c and 47k are disposed opposed to the photosensitive drums 81y, 81m, 81c and 81k, respectively, and are disposed in contact with the intermediary transfer belt 44b.

A positive transfer bias is applied to the intermediary transfer belt 44b by the primary transfer rollers 47, whereby toner images having a negative polarity are superposedly transferred successively from the photosensitive drums 81 onto the intermediary transfer belt 44b. As a result, a full-color toner image obtained by developing the electrostatic latent images on the surfaces of the photosensitive drums 81 is transferred on the intermediary transfer belt 44b, and the intermediary transfer belt 44b moves. The secondary transfer portion 45 includes a secondary transfer inner roller 45a and a secondary transfer outer roller 45b. By applying a positive secondary transfer bias to the secondary transfer outer roller 45b, the full-color (toner) image formed on the intermediary transfer belt 44b is transferred onto the sheet S.

The fixing device 46 includes a fixing roller 46a and a pressing roller 46a. The sheet S is nipped and fed between the fixing roller 46a and the pressing roller 46b, so that the toner image transferred on the sheet S is pressed and heated to be fixed on the sheet S.

The sheet conveying portion 50 conveys the sheet S, fed from the sheet feeding portion 17, from the image forming portion 40 to the sheet discharging portion 60.

The sheet discharging portion 60 includes a discharging roller pair 61 provided in a downstream side of the discharging path 53 and includes a discharge tray 62 provided in a downstream side of the discharging roller pair 61.

The controller 70 is accommodated at a rear portion of the apparatus main assembly 10 and constituted by a computer and, e.g., includes a CPU, an ROM for storing a program for controlling respective portions, an RAM for temporarily storing data, and an input-and-output circuit for inputting and outputting signals relative to an external device. The controller 70 is connected via the input-and-output circuit with each of the image reading portion 16, the sheet feeding portion 17, the image forming portion 40, the sheet conveying portion 50, the sheet discharging portion 60, the operating unit 11, and the unshown human sensor, and transfers signals with the respective portions and controls operations of the respective portions. Further, the controller 70 is capable of setting, for example, in a copying function, a copying sheet number, enlargement, reduction, density, double sides/single side, color/monochromatic, a sheet feeding cassette, a sheet size, and the like by an operation of the operating unit 11 or the like by a user.

An image forming operation in the image forming apparatus 1 constituted as described above will be described.

When the image forming operation is started, first, the photosensitive drum 81 is rotated, and the surface thereof is electrically charged by the charging roller 82. Then, the laser scanner 43 emits, on the basis of image information, laser light toward the surface of the photosensitive drum 81, so that the electrostatic latent image is formed on the surface of the photosensitive drum 81. The toner is deposited on the electrostatic latent image to develop (visualize) the electrostatic latent image into a toner image, and then the toner image is transferred onto the intermediary transfer belt 44b.

On the other hand, in parallel to such a toner image forming operation, the feeding roller 19 is rotated to feed the uppermost sheet S in the sheet cassette 18 while separating the sheet S. Then, the sheet S is fed to the secondary transfer portion 45 via the pre-secondary transfer feeding path 51 by being timed to the toner image on the intermediary transfer belt 44b. Then, the toner image is transferred from the intermediary transfer belt 44b onto the sheet S, and the sheet S is fed into the fixing device 46, in which the (unfixed) toner image is heated and pressed, thus being fixed on the surface of the sheet S. The sheet S is discharged by the discharging roller pair 61, so that the sheet S is stacked on the discharge tray 62 which is an inner discharging portion.

Next, a constitution of a connecting portion between the apparatus main assembly 10 and the operating unit 11 of the above-described image forming apparatus 1 will be described specifically using FIGS. 2-5.

On a side surface of the apparatus main assembly 10 in the right side of the front surface of the apparatus main assembly 10, an openable door 12 is provided. By opening the door 12, the operator is capable of removing the sheet in the case where the sheet on which the image is formed stops in a feeding path. In this embodiment, the case where the door 12 is provided in the right side of the front surface of the apparatus main assembly 10 was described, but the present invention is not limited thereto. The door 12 may also be disposed in a left side of the front surface of the apparatus main assembly 10.

Figure 2:
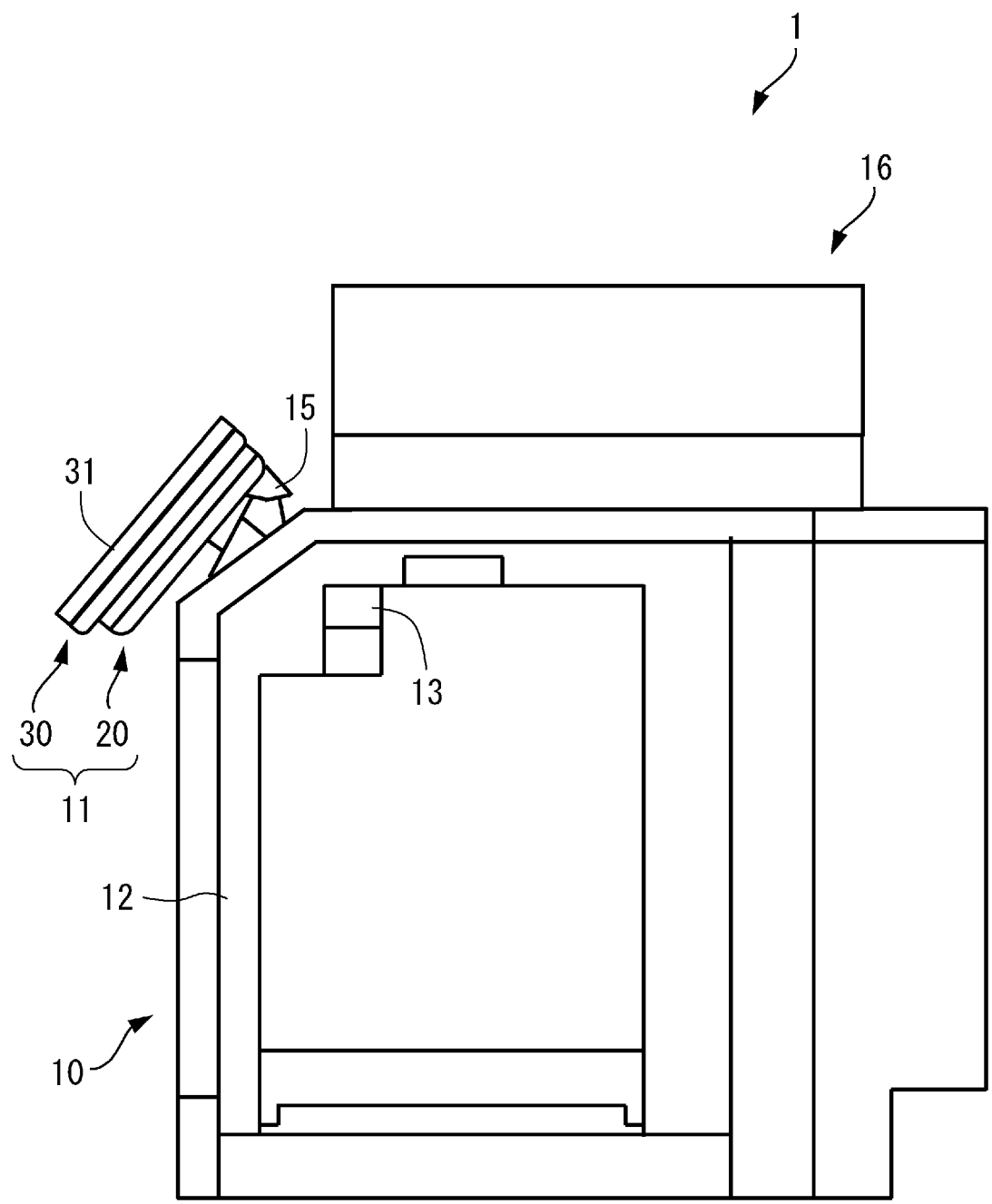
FIG. 2 is a right side view showing the schematic structure of the image forming apparatus in the embodiment.
Figure 3:
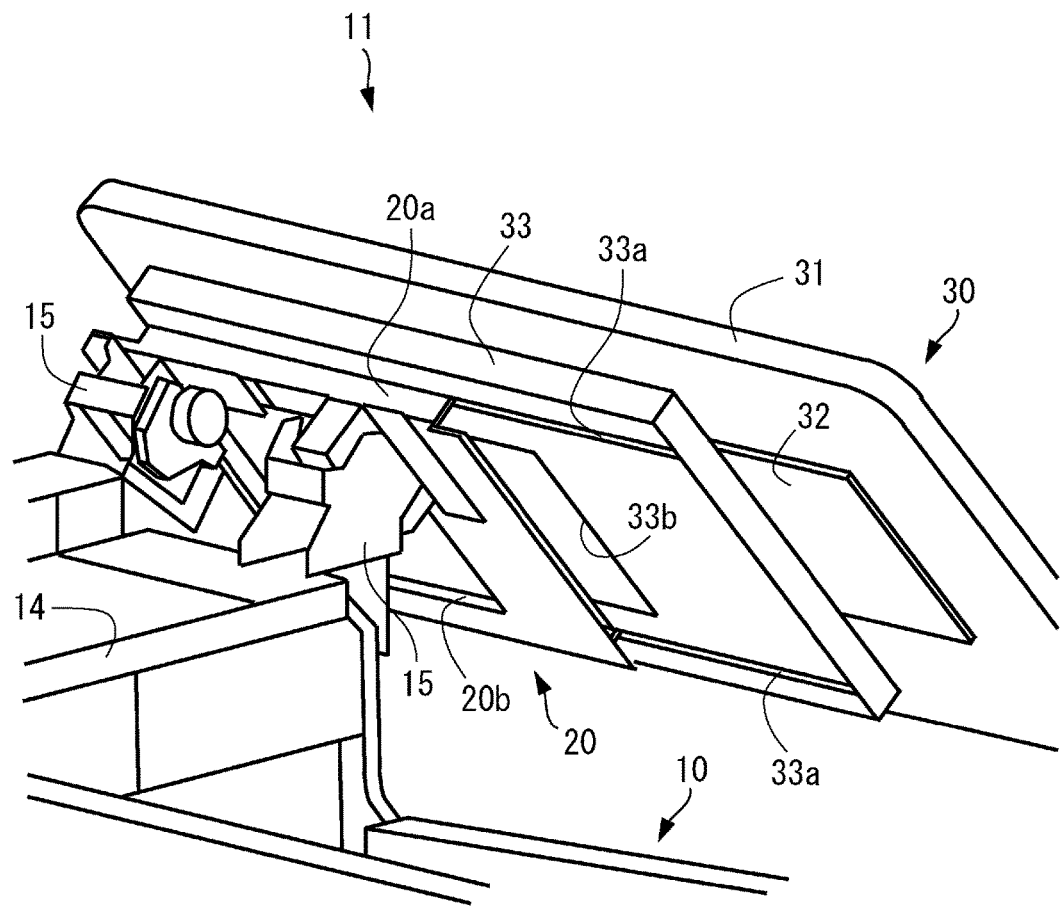
FIG. 3 is a perspective view showing a state in which a front cover of an apparatus main assembly of the image forming apparatus and a rear (surface) cover of an operating panel are demounted at a mounting portion of the operating panel to the apparatus main assembly of the image forming apparatus in the embodiment.

As shown in FIGS. 2 and 3, the operating unit 11 is rotatable (tiltable) relative to a frame 14 by a hinge portion 15 having a hinge structure. The hinge portion 15 is fastened, with screws, to each of the frame 14 and a supporting frame 20 of the operating unit 11. As a result, the operating unit 11 rotates in a front-rear and up-down direction, relative to the apparatus main assembly 10, about a center axis extending in a left-right direction of the apparatus main assembly 10, and therefore, the operator (user) can use the operating panel 30 in a state in which an angle of the operating panel 30 is appropriately set.

The operating unit 11 has a sliding function in the left-right direction as described later, so that the operating panel 30 of the operating unit 11 is provided movably in the left-right direction relative to the apparatus main assembly 10. The operating panel 30 is provided movably between two positions consisting of a first position (FIG. 4) where viewability of the sheet discharged on the discharge tray 62 is given preference and a second position (FIG. 5) where the operating panel 30 does not constitute an obstacle to access to the door 12 during a sheet removing operation. That is, the operating panel 30 is movably mounted to the apparatus main assembly 10 and is capable of inputting a signal to the apparatus main assembly 10.

Figure 4:
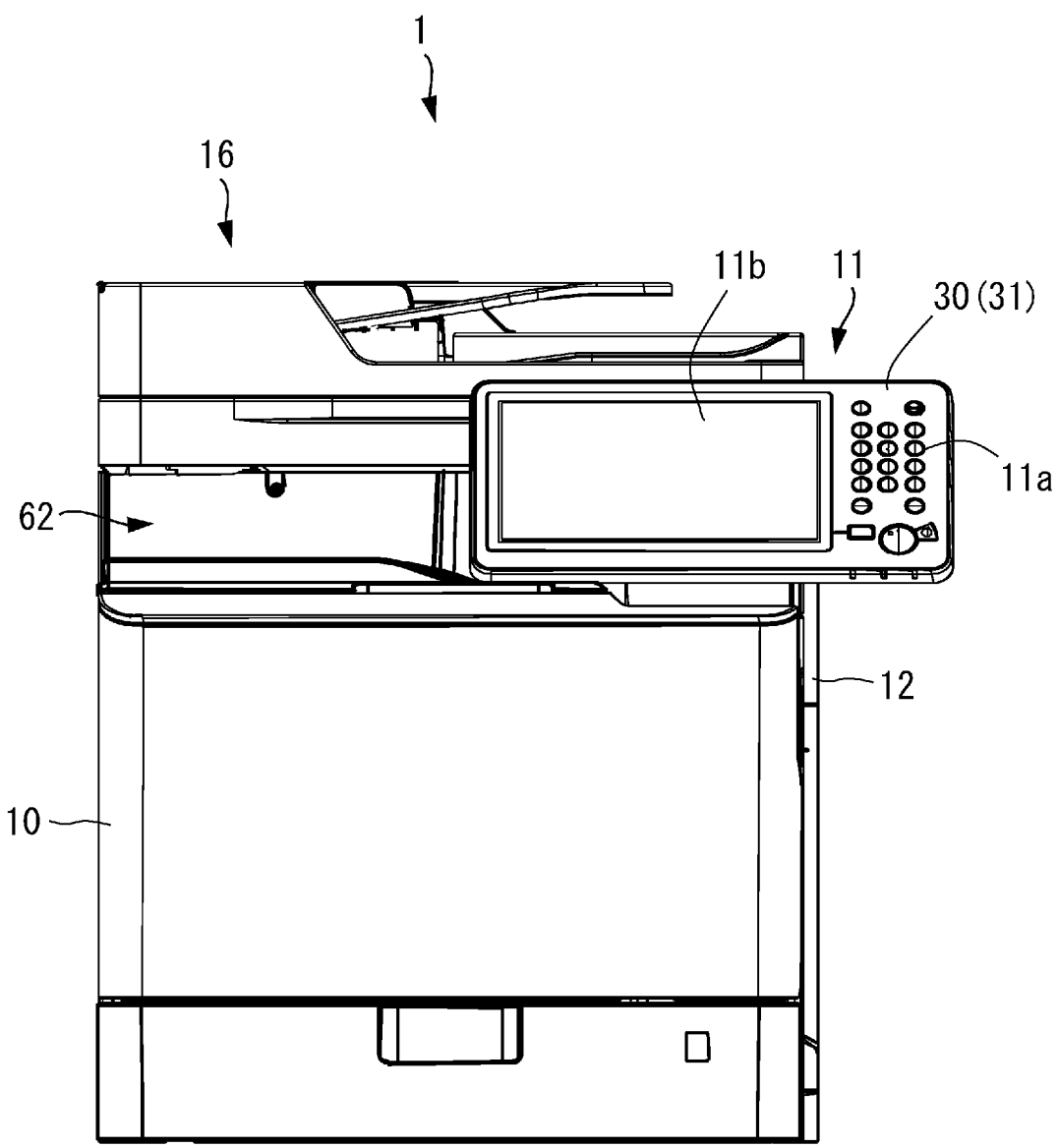
FIG. 4 is a front view of the image forming apparatus in the embodiment in which the operating panel is in a first position.

The first position is, as shown in FIG. 4, the position where the viewability of the discharge tray 62 is given preference and where a right end portion of the operating panel 30 projects from the door 12 provided on the right side surface of the apparatus main assembly 10 toward a right side of the door 12. In this case, the large-sized operating panel 30 is disposed so that the discharge tray 62 on which an image formable sheet with a smallest size is discharged is not blocked by the operating panel 30, and therefore, the viewability of the discharge tray 62 can be improved.

Figure 5:
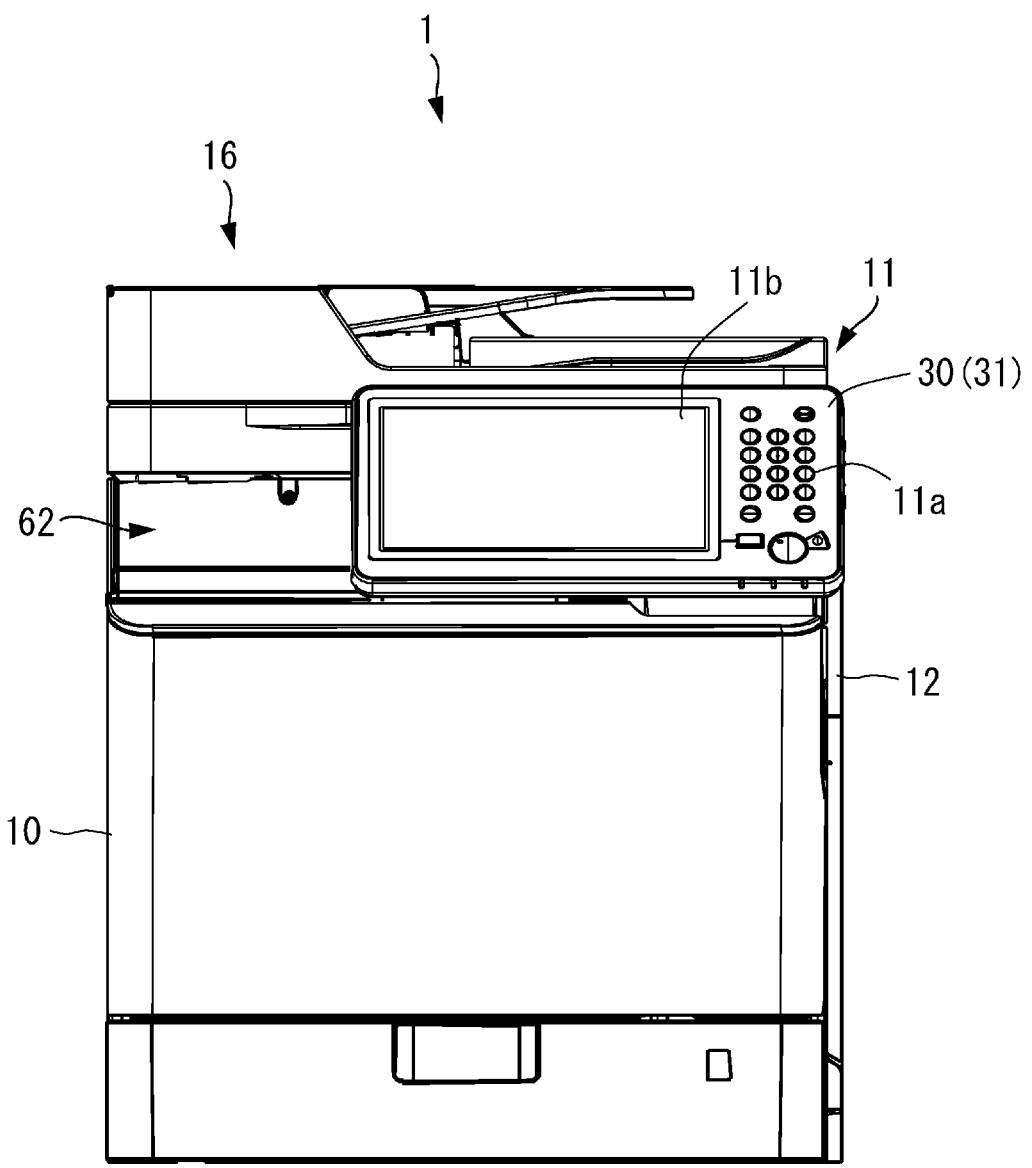
FIG. 5 is a front view of the image forming apparatus in the embodiment in which the operating panel is in a second position.

Further, the second position is, as shown in FIG. 5, the position where opening/closing operativity of the door 12 is given preference and where the right end portion of the operating panel 30 little projects from the door 12 provided on the right side surface of the apparatus main assembly 10 toward the right side of the door 12. In this case, the large-sized operating panel 30 is disposed so as not to block the door 12, and therefore, the opening/closing operativity of the door 12 can be improved.

Thus, in the image forming apparatus 1 in this embodiment, the operating panel 30 has a constitution in which the operating panel 30 slides in the left-right direction relative to the apparatus main assembly 10 so that the operating panel 30 can be at rest in each of the first and second positions. As a result, it is possible to compatibly realize the viewability of the discharge tray 62 and the operativity of the door 12 when the door 12 is opened and closed. Incidentally, it is desirable that the second position is defined as a predetermined position (home position) where the operating panel 30 is ordinarily used rather than the first position, from viewpoints that a frequency of an output of the sheet with the smallest size of defined sheet sizes is low and that the operativity when a sheet removing operation is required is given preference. In the case where the operating panel 30 is in the second position which is the predetermined position, when the sheet with the smallest size is outputted and the operator (user) takes a look at the discharge tray 62, the operating panel 30 is slid from the second position to the first position. On the other hand, in the case where the operating panel 30 is in the first position which is not the predetermined position, when the sheet jams in the apparatus main assembly 10 and is removed from the apparatus main assembly 10, the operator slides the operating panel 30 from the first position to the second position before the operator opens the door 12.

Figure 6:
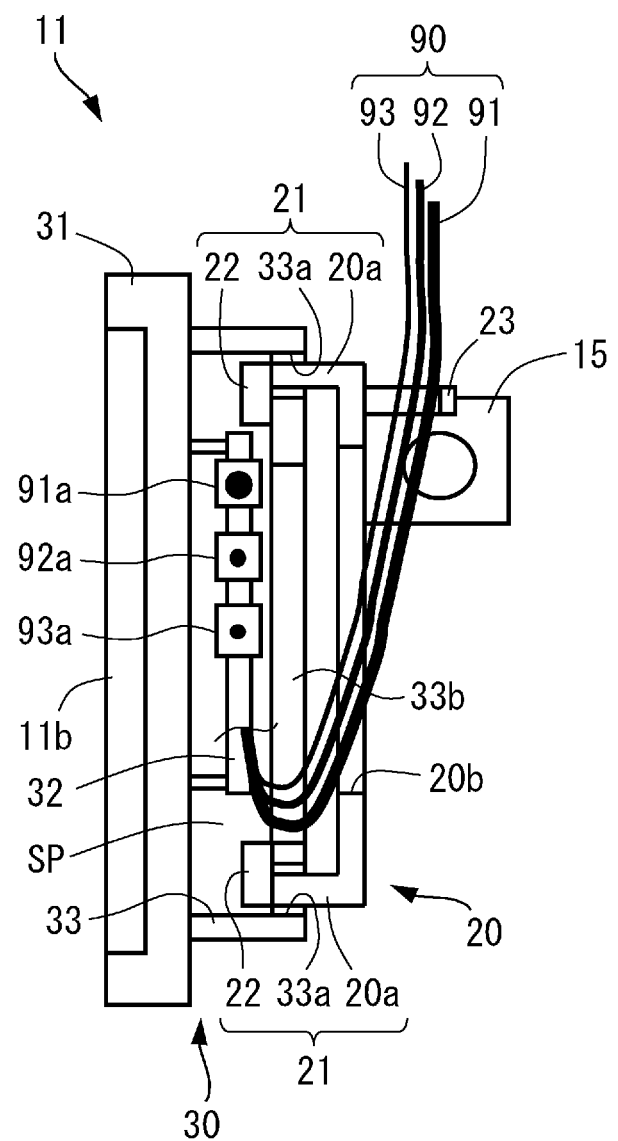
FIG. 6 is a schematic sectional view showing the operating panel of the image forming apparatus in the embodiment.

Next, a constitution of the operating unit 11 will be described with reference to FIGS. 6 to 8. In this embodiment, as regards the operating unit 11, a longitudinal direction is the left-right direction, a widthwise direction is the up-down direction, and a thickness direction is the front-rear direction.

The operating unit 11 includes the supporting frame (holding portion) 20, the operating panel (operating portion) 30, a pair of guiding portions 21 and a retaining portion 23. The supporting frame 20 is mounted to the apparatus main assembly 10 through the hinge portion 15. The supporting frame 20 has a substantially rectangular flat plate shape extending along the operating panel 30 and includes flanges 20a projecting toward the operating panel 30 at upper and lower edge portions of the supporting frame 20. That is, the supporting frame 20 is fixed to the apparatus main assembly 10 and movably hold the operating panel 20. The retaining portion 23 has a U-channel and both free ends thereof are fixedly provided on an upper rear side surface of the supporting frame 20. A plurality of cables 90 described later are inserted through an inside of the retaining portion 23 in the up-down direction, and thus are retained and regulated by the supporting frame 20. In this embodiment, the retaining portion 23 is provided at an upper edge portion of the supporting frame 20 extending along the movement direction of the operating panel 30 and is disposed between the hinge portions 15.

The operating panel 30 is provided movably in the left-right direction relative to the supporting frame 20, and the plurality of cables 90 described later are connected with the operating panel 30. The operating panel 30 includes a panel portion 31, a substrate 32 and a guiding frame 33. The panel portion 31 has a substantially rectangular flat plate shape and includes operating buttons 11a and a display portion 11b (FIG. 1) at a front-side surface of the image forming apparatus 1. The substrate 32 is fixed by, e.g., fastening with screws along a back side of the panel portion 31 and sends and receives electric signals by being connected with the operating buttons 11a, the display portion 11b and the unshown human sensor. The substrate 32 is provided with three connectors 34, 35 and 36 for connecting the plurality of cables 90 described later. The substrate 32 is an electrical substrate for controlling the panel portion 31 on the basis of a signal from the controller 70 of the apparatus main assembly 10. The guiding frame 33 has a substantially rectangular flat plate shape extending along the panel portion 31, and upper and lower edge portions of the guiding frame 33 project toward the back side of the panel portion 31 and are fixed by fastening with screws, for example.

The pair of guiding portions 21 is disposed in a pair of parallel rectilinear line shapes and slidably holds the operating panel 30 relative to the supporting frame 20. Each of the guiding portions 21 includes a guiding hole (opening) 33a, the flange portion 20 of the supporting frame 20 penetrating through the guiding hole 33a, and a rail portion 22 fixed to a free end of the flange portion 20a. The guiding hole 33a has a rectilinear line shape extending in the left-right direction which is the longitudinal direction and is formed at each of upper and lower portions of the guiding frame 33. The flange portion 20a of the supporting frame 20 is provided in a state in which the flange portion 20a penetrates through the associated guiding hole 33a from the rear side toward the front side, and the rail portion 22 is provided in the front side of the guiding frame 33. The flange portion 20a and the rail portion 22 are fixed by fastening with a screw, for example.

Next, an arrangement of the plurality of cables 90 for electrically connecting the apparatus main assembly 10 and the operating unit 11 will be specifically described. The plurality of cables 90 connect the controller 70 of the apparatus main assembly 10 and the substrate 32 of the operating unit 11. In this embodiment, the plurality of cables 90 include a signal cable (first cable) 91 capable of high-speed transmission, a power source cable (second cable) 92 and a sensor cable 93. Each of the cables 91, 92 and 93 electrically connects the apparatus main assembly 10 and the operating unit 11. The signal cable 91 is disposed between the operating panel 30 and the supporting frame 20 so as to form a first loop 91L from the retaining portion 23 until the signal cable 91 is connected with the first connector 34. The power source cable 92 is disposed between the operating panel 30 and the supporting frame 20 so as to form a second loop 91L from the retaining portion 23 until the signal cable 91 is connected with the second connector 35. The sensor cable 93 is disposed between the operating panel 30 and the supporting frame 20 so as to form a third loop 93L from the retaining portion 23 until the signal cable 91 is connected with the third connector 36.

The signal cable 91 is a cable for sending an image signal for displaying associated information at the display portion 11b of the operating unit 11, and as the signal cable 91, a relatively thick cable which is called electrically shielded signal cable for permitting high-speed transmission of the image signal is used. That is, the signal cable 91 has a cable diameter larger than a cable diameter of the power source cable 92. In this embodiment, a cable of 4 mm in diameter is used, and at a free end portion thereof in the operating unit 11 side, the connector 91a connectable with the first connector 34 of the substrate 32 is provided. The power source cable 92 is a cable for supplying electric power to the substrate 32, and as the power source cable 92, a mini-USB cable is used in this embodiment. In this embodiment, a cable of 3 mm in diameter is used, and at a free end portion thereof in the operating unit 11 side, the connector 92a connectable with the second connector 35 of the substrate 32 is provided. That is, the power source cable 92 has the cable diameter smaller than the cable diameter of the signal cable 91. The sensor cable 93 is an ordinary cable, which is not shielded, for permitting low-speed transmission of a signal, sent from the substrate 32, for controlling the human sensor. In this embodiment, 10 cables each having a diameter of about 1 mm are tied in a bundle so as to provide a diameter of about 2.5 mm, and at a free end portion thereof in the operating unit 11 side, the connector 93a connectable with the connector 36 of the substrate 32 is provided. Therefore, the cable diameters of these cables 91, 92 and 93 decrease in the order of the signal cable 91, the power source cable 92 and the sensor cable 93, and in the named order, bending rigidity values decrease.

The substrate 32 is provided with the first connector 34, the second connector 35 and the third connector 36. The first connector 34 is provided in the operating panel 30 and is connected with the signal cable 91. The second connector 35 is provided in the operating panel 30 and is connected with the power source cable 92. The third connector 36 is provided in the operating panel 30 and is connected with the sensor cable 93. The first connector 34, the second connector 35 and the third connector 36 are provided and juxtaposed along one side (side close to the operating buttons 11a) of left and right edge portions of the substrate 32. Further, not only the first connector 34 is positioned in a side closer to the retaining portion 23 than the second connector 35 is, but also the second connector 35 is positioned in a side closer to the retaining portion 23 than the third connector 35 is. That is, the first connector 34, the second connector 35 and the third connector 36 are arranged in a direction crossing the movement direction of the operating panel 30.

The respective connectors 34, 35 and 36 are disposed from the side close to the retaining portion 23 in the order of the first connector 34, the second connector 35 and the third connector 36. That is, the respective connectors 34, 35 and 36 are disposed so that the thicker cable connected with the associated connector is disposed closer to the retaining portion 23 and so that the diameter of the cable connected with the connector decreases in a direction spaced from the retaining portion 23, i.e., the bending rigidity of the cable decreases in the direction spaced from the retaining portion 23.

The plurality of cables 90 (91, 92, 93) are disposed while forming the loops 91L, 92L and 93L in a space formed by the supporting frame 20 and the operating panel 30, i.e., an inside space SP of the operating unit 11. The plurality of cables 90 form the loops 91L, 92L and 93L in the inside space SP formed between the pair of guiding portions 21. The first connector 34 and the second connector 35 are disposed so that a radium of curvature of the first loop 91L is larger than a radium of curvature of the second loop 92L. Further, the second connector 35 and the third connector 36 are disposed so that the radium of curvature of the second loop 92L is larger than a radium of curvature of the third loop 93L.

Figure 7:
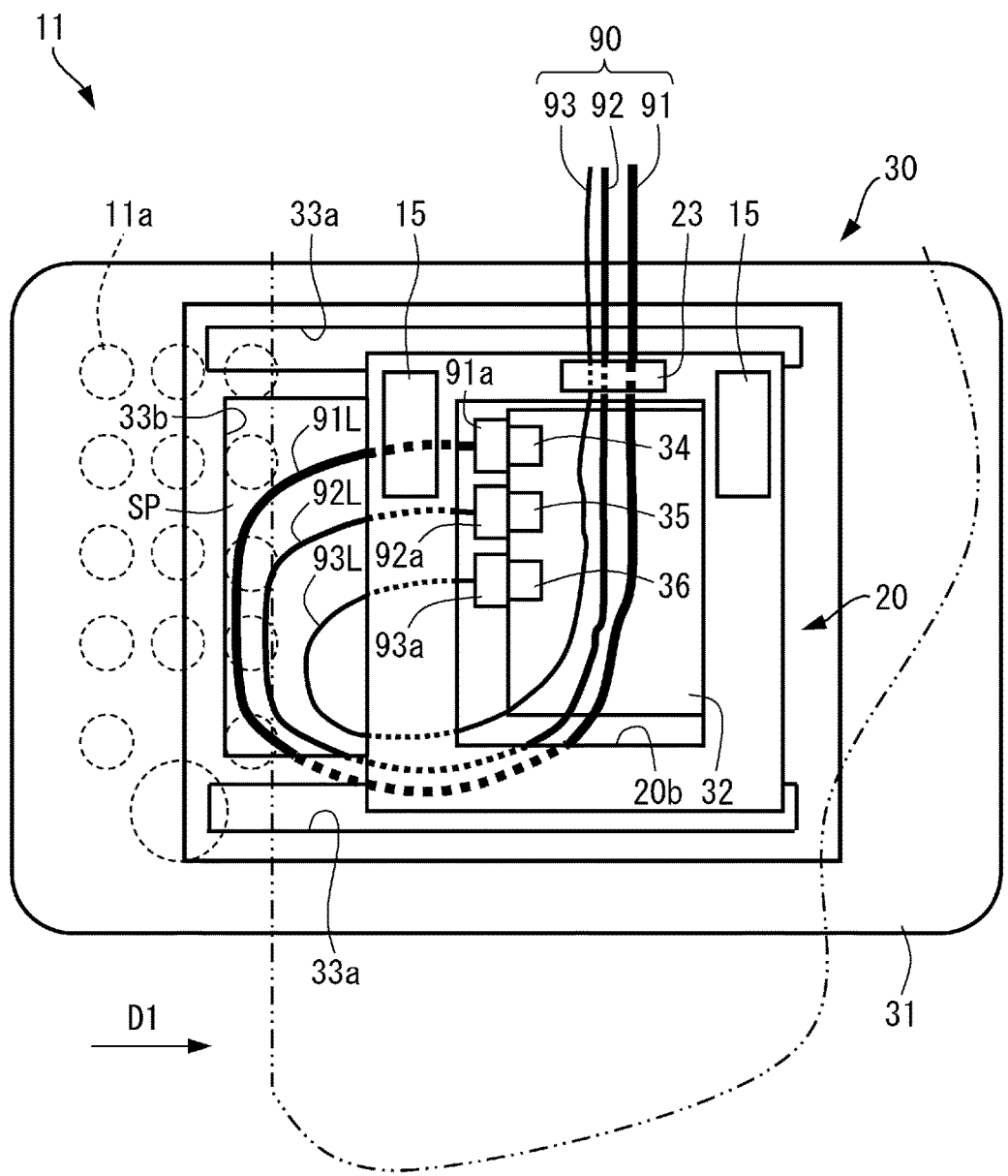
FIG. 7 is a rear view of the image forming apparatus in the embodiment when the operating panel from which the rear cover is demounted is in the first position.
Figure 8:
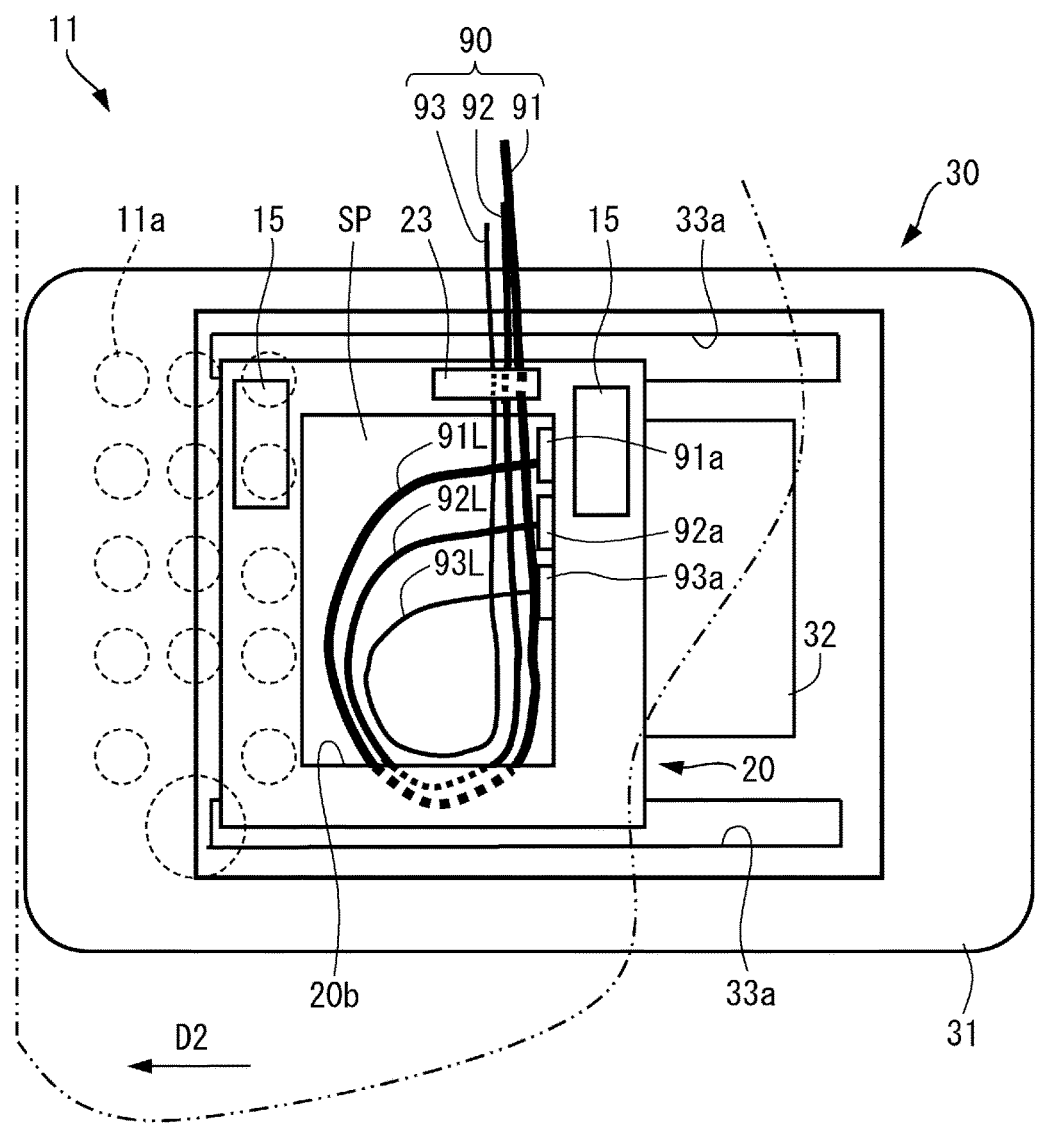
FIG. 8 is a rear view of the image forming apparatus in the embodiment when the operating panel from which the rear cover is demounted is in the second position.

In this embodiment, in a state the respective connectors 34 to 36 are most spaced from the retaining portion 23 within a movable range of the operating panel 30 relative to the supporting frame 20 FIG. 7), the plurality of cables 90 are provided so as to extend from the respective connectors 34 to 36 toward a side spaced from the retaining portion 23. For this reason, the plurality of cables 90 form the loops 91L to 93L in a side opposite from the retaining portion 23 with respect to the respective connectors 34 to 36. The plurality of cables 90 form the loops 91L to 93L and pass through an opening 33a of the guide frame 33 and an opening 20a of the supporting frame 20 and then penetrate through the retaining portion 23, so that movement thereof in the left-right direction and the front-rear direction is limited (regulated) and the cables 90 are connected with an inside of the apparatus main assembly 10 (wiring). As a result, the plurality of cables 90 are provided while forming the loops 91L to 93L of about 270 degrees. That is, the first connector 34 is disposed adjacently to the second connector 35 so as to be positioned outside the second loop 92L formed by the power source cable 92. Similarly, the second connector 35 is disposed adjacently to the third connector 36 so as to be positioned outside the third loop 93L formed by the sensor cable 93.

Here, the first connector 34 is closer to the retaining portion 23 and one guiding portion 21 than other connectors 35 and 36 are. For that reason, the signal cable 91 capable of forming the first loop 91L which extends in the inside space SP between the pair of guiding portion 21 and which has a large radium of curvature. Further, the power source cable 92 is disposed while forming the second loop 92L inside the first loop 91L of the signal cable 91. Further, the sensor cable 93 is disposed while forming the third loop 93L inside the second loop 92L of the power source cable 92. That is, the signal cable 91, the power source cable 92 and the sensor cable 93 form the loops 91L, 92L and 93L, respectively, in a triply nested loop structure.

Next, a sliding operation of the operating unit 11 of the above-described image forming apparatus 1 will be specifically described. As shown in FIG. 4, the operating panel 30 being in the first position provides optimum viewability of the discharge tray 62.

In this state, in the case where the sheet fed during the image formation causes a jam for some reason, there is a need to perform a removing process (treatment) of the jammed sheet after opening the door 12. At this time, the operating panel 30 projects in the right side of the apparatus main assembly 10, and therefore, it is preferable that at first, the operator slides the operating panel 30 to the second position (FIG. 5) and then opens the door 12 and thereafter performs the removing process of the jammed sheet. The reason why the operation (removing process) is performed after the operator slides the operating panel 30 is that in the case where the operating panel 30 is in the first position, when the operator standing in front of the image forming apparatus 1 holds a grip (handle) 13 of the door 12, the operating panel 30 constitutes an obstacle like as a wall in front of the grip 13. In general, the grip 13 of the door 12 is provided at a position spaced from a rotatable hinge of the door to the extent possible so that a burden on the operator can be alleviated, and in many cases, the position of the grip 13 is at an upper portion of the image forming apparatus 1 and is in a region in which the operating panel 30 is projected roughly as seen from the front surface of the image forming apparatus 1.

On the other hand, as shown in FIG. 5, the operating panel 30 being in the second position is optimum when the door 12 is opened and closed. The second position is inferior in viewability of the discharge tray 62 to the first position. However, even when the operating panel 30 enters a visible region of the discharge tray 62, a side portion of the discharge tray 62 is a remaining open space, and therefore, even when the operating panel 30 is in the second position, the operator visually recognizes the discharge tray 62 through the remaining open space and can access to the sheet and then can take (remove) the sheet. Accordingly, in the case where the operating panel 30 is in the second position, in order to visually recognize and remove the sheet, the operating panel 30 is not necessarily be required to be slid. Accordingly, the operating panel 30 is in the second position more than the first position in many cases, so that the second position is the predetermined position. Therefore, sliding operativity of the operating panel 30 in this embodiment is ensured sufficiently in consideration of alleviation of the burden on the operator when the operating panel 30 is moved from the first position to the second position before the operator opens the door 12.

Here, a behavior of the plurality of cables during the sliding of the operating panel 30 will be specifically described. As shown in FIG. 7, in the case where the operating panel 30 is in the first position, the plurality of cables 90 from the loops 91L to 93L in the inside space SP. At this time, the power source cable 92 forms the second loop 92L inside the first loop 91L of the signal cable 91, and the sensor cable 93 forms the third loop 93L inside the second loop 92L of the power source cable 92.

In the case where the operator performs a sliding operation of the operating panel 30, the operating panel 30 is slid to the second position by applying an external force to the operating panel 30 in a direction D1. As a result, the plurality of cables 90 decrease the loops 91L to 93L while forming the loops 91L and 93L in the inside space SP as shown in FIG. 8. Also at this time, the power source cable 92 forms the second loop 92L inside the first loop 91L of the signal cable 91, and the sensor cable 93 forms the third loop 93L inside the second loop 92L of the power source cable 92. That is, when the operating panel 30 is moved relative to the supporting frame 20, the power source cable 92 is disposed while forming (retaining) the second loop 92L inside the first loop 91L of the signal cable 91. Further, when the operating panel 30 is moved relative to the supporting frame 20, the sensor cable 93 is disposed while forming (retaining) the third loop 93L inside the second loop 92L of the power source cable 92.

When the operating panel 30 is in the second position, the respective cables 91, 92 and 93 generate reaction such that the loops 91L to 93L are returned to the large loops (in the first position) by the reaction generated by bending of the loops 91L to 93L to a small size. As regards the respective cables 91, 92 and 93, the reaction due to the bending increases with a smaller radium of curvature. Further, among the respective cables 91, 92 and 93, with a larger diameter, stiffness, bending rigidity and reaction of the associated cable increase. When the reaction values of the cables 91, 92 and 93 increase, an operating feeding when the associated cable is operated becomes heavy. In this embodiment, the cables 91, 92 and 93 are disposed so that values of the radium of curvature of the cables 91, 92 and 93 are increased with increasing diameters of the cables 91, 92 and 93, so that the reaction when the operating panel is moved from the first position to the second position can be reduced. Incidentally, in the case where the operator performs the sliding operation of the operating panel 30 to the first position, the operating panel 30 is slid to the first position by applying an external force to the operating panel 30 in a direction D2.

Here, the shielded cable such as the signal cable 91 has stiffness to itself, and therefore, there is a possibility that in a use such that the cable is bend, the cable is broken unless a bending radius which is a predetermined value or more is ensured. For this reason, separately from the operation feeding, there is a need to ensure the bending radius which is the predetermined value (radius) or more. Therefore, in this embodiment, the connectors 34, 35 and 36 are provided between the guiding portions 21, so that loop shapes of the plurality of cables 90 can be formed in a dead space between the guiding portions 21 and thus enlargement of a size of the operating unit 11 can be suppressed.

As described above, according to the image forming apparatus 1 in this embodiment, the signal cable 91 large in cable diameter is disposed while forming the first loop 91L. For this reason, compared with the case where the signal cable 91 formed in a minimum length, the reaction of the signal cable 91 becomes small, so that a sliding operation force of the operating panel 30 decreases and thus operativity can be improved. The cables 91 and 92 are disposed so that the radium of curvature of the first loop 91L is larger than the radium of curvature of the second loop 92L. Further, not only the second loop 92L of the power source cable 92 is disposed inside the first loop 91L of the signal cable 91, but also the third loop 93L of the signal cable 93 is disposed inside the second loop 92L of the power source cable 92. For this reason, compared with the case where the plurality of cables are provided in an entangled state without forming (triply) nested loop structure, an accommodating space of the plurality of cables can be downsized, so that downsizing of the operating unit 11 can be realized. Accordingly, it is possible to compatibly realize the operating property (operativity) for moving the operating panel 30 and the downsizing of the operating unit 11 while using the signal cable 91 having the large bending rigidity.

Further, according to the image forming apparatus 1 in this embodiment, when the operating panel 30 is moved relative to the supporting frame 20, the power source cable 92 is disposed while forming the second loop 92L inside the first loop 91L of the signal cable 91. Further, when the operating panel 30 is moved relative to the supporting frame 20, the sensor cable 93 is disposed while forming the third loop 93L inside the second loop 92L of the power source cable 92. For this reason, when the operating panel 30 is moved between the first position and the second position, the signal cable 91, the power source cable 92 and the sensor cable 93 form the loops 91L, 92L and 93L, respectively, in the triply nested shape. Therefore, while using the signal cable 91 having the large bending rigidity, the operating property for moving the operating panel 30 and the downsizing of the operating unit 11 can be realized in combination.

Further, according to the image forming apparatus 1 in this embodiment, the respective connectors 34, 35 and 36 are disposed from the side close to the retaining portion 23 in the order of the first connector 34, the second connector 35 and the third connector 36. That is, the respective connectors 34, 35 and 36 are disposed so that the thicker cable connected with the associated connector is disposed closer to the retaining portion 23 and so that the cable connected with the connector becomes thin in a direction spaced from the retaining portion 23, i.e., the bending rigidity of the cable decreases in the direction spaced from the retaining portion 23. Further, wiring is carried out in the direction spaced from the retaining portion 23 and then is returned to the retaining portion 23, so that the bending radius can be obtained to the maximum in the inside space SP of the operating unit 11 in which the width is limited, and thus the influence of the reaction of the cable on the operating force can be suppressed.

Further, the power source cable 92 and the sensor cable 93 are smaller in bending radius than the signal cable 91. However, the influence of the bending of the cables 92 and 93 is equal to or smaller than that of the signal cable 91, and as regards the bending radius, the cables 92 and 93 are laid (wired) so as to extend inside the signal cable 91, so that the operating force can be reduced by ensuring the bending radium to the maximum.

Further, according to the image forming apparatus 1 in this embodiment, the loops 91L to 93L are formed between the pair of guiding portions 21. That is, the space in which the loops 91L to 93L of the plurality of cables are formed is provided in the inside space SP which is the dead space which is positioned on the side of the substrate 32 and between the guiding portions 21, so that wiring of the plurality of cables 90 can be carried out without thickening the operating unit 11. For this reason, it is possible to suppress deterioration of the operating property due to the thickening of the operating unit 11 without increasing the thickness and external size of the operating unit 11.

In the above-described image forming apparatus 1 in this embodiment, as regards the plurality of cables 90, the case where the three cables consisting of the signal cable 91, the power source cable 92 and the sensor cable 93 are used was described, but the present invention is not limited thereto. As the plurality of cables 90, for example, two cables consisting of the signal cable 91 and the power source cable 92 or four or more cables may also be used.

Further, of the plurality of cables 90, the case where the signal cable 91 is the cable having the largest bending rigidity was described, but the present invention is not limited thereto. The signal cable 91 may also be another cable.

Further, in the image forming apparatus 1 in this embodiment, the case where the plurality of cables 90 are provided while forming the loops 91L to 93L of about 270 degrees was described, but the present invention is not limited thereto. For example, the plurality of cables may also be provided while forming the loops of about 180 degrees or not less than 360 degrees.

According to the present invention, the first cable having the large cable diameter is disposed while forming the first loop. For this reason, compared with the case where the first cable is provided in a minimum length, the reaction of the cable decreases, so that the sliding operation force of the operating panel (e.g., operating panel) decreases and thus the operating property can be improved. Further, the cables are disposed so that the radium of curvature of the first loop is larger than the radium of curvature of the second loop, and therefore, compared with the case where the plurality of cables are provided in an entangled state, an accommodating space of the plurality of cables can be downsized, so that downsizing of the operating panel 11 can be realized. Accordingly, it is possible to compatibly realize the operating property (operativity) for moving the operating panel 30 and the downsizing of the operating panel 11 while using the cable having the large bending rigidity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-176558 filed on Sep. 9, 2016, which is hereby incorporated by reference herein in its entirety.

What is claimed is:

1. An image forming apparatus comprising:
a main assembly;
an operating portion mounted in a front surface side of said main assembly so as to be slidable in a widthwise direction of said main assembly and configured to be capable of inputting a signal to said main assembly, wherein said operating portion includes a display screen, a first connector and a second connector;
a first cable configured to electrically connect said main assembly and said first connector of said operating portion in a state in which a first loop is formed and configured to send an image signal for displaying associated information at the display screen; and
a second cable having a cable diameter smaller than a cable diameter of said first cable and configured to electrically connect said main assembly and said second connector of said operating portion in a state in which a second loop is formed inside said first cable when said first cable and said second cable are seen in a direction crossing said display screen.

2. An image forming apparatus according to claim 1, further comprising a pair of parallel guiding portions configure to slidably hold said operating portion relative to said main assembly,
wherein the first loop and the second loop are formed between said guiding portions.

3. An image forming apparatus according to claim 1, wherein said second cable is a power source cable configured to supply an electric power from the main assembly to the the operating portion.

4. An image forming apparatus according to claim 1, wherein said first connector and said second connector are provided adjacently to each other with respect to a direction perpendicular to the widthwise direction.

5. An image forming apparatus comprising:
a main assembly;
an operating portion movably mounted to said main assembly and configured to be capable of inputting a signal to said main assembly;
a holding portion fixed to said main assembly and configured to movably hold said operating portion;
a first cable configured to electrically connect said main assembly and said operating portion;
a second cable configured to electrically connect said main assembly and said operating portion and having a cable diameter smaller than a cable diameter of said first cable;
a first connector provided in said operating portion and configured to be connected with said first cable;
a second connector provided in said operating portion and configured to be connected with said second cable; and
a retaining portion provided in said holding portion and configured to retain said first and second cables at said holding portion,
wherein said first cable is disposed between said operating portion and said holding portion so that said first cable forms a first loop from said retaining portion until said first cable is connected with said first connector,
wherein said second cable is disposed between said operating portion and said holding portion so that said second cable forms a second loop from said retaining portion until said second cable is connected with said second connector, and
wherein said first and second connectors are disposed so that a radium of curvature of the first loop is larger than a radium of curvature of the second loop.

6. An image forming apparatus according to claim 5, wherein when said operating portion moves relative to said holding portion, said second cable is disposed so as to form the second loop inside the first loop.

7. An image forming apparatus according to claim 5, wherein in a state in which said first connector and said retaining portion are most spaced from each other within a movable range of said operating portion, said first and second cables extend from said first and second connectors, respectively, toward a spaced side from said retaining portion and form the first and second loops, respectively, in a side opposite from the spaced side with respect to said retaining portion.

8. An image forming apparatus according to claim 5, wherein said retaining portion is provided at an edge portion of said holding portion along a movement direction of said operating portion, and
wherein said first and second connectors are provided and arranged in a direction crossing the movement direction, and the first connector is positioned in a side closer to said retaining portion than said second connector is.

9. An image forming apparatus according to claim 5, further comprising a pair of parallel guiding portions configured to slidably hold said operating portion relative to said holding portion,
wherein the first and second loops are formed between said guiding portions.

10. An image forming apparatus according to claim 5, wherein said first cable is a cable configured to send an image signal.

11. An image forming apparatus according to claim 5, wherein said first connector is disposed adjacently to said second connector so as to be positioned outside the second loop formed by said second cable.

* * * * *